US012465356B2

(12) United States Patent
Clay et al.

(10) Patent No.: US 12,465,356 B2
(45) Date of Patent: Nov. 11, 2025

(54) MEDICAL DEVICE PLACEMENT ASSEMBLIES AND METHODS OF USING THE SAME

(71) Applicant: Boston Scientific Scimed, Inc., Maple Grove, MN (US)

(72) Inventors: Jeffrey Clay, Southlake, TX (US); Barry Weitzner, Acton, MA (US)

(73) Assignee: Boston Scientific Scimed, Inc., Maple Grove, MN (US)

( * ) Notice: Subject to any disclaimer, the term of this patent is extended or adjusted under 35 U.S.C. 154(b) by 723 days.

(21) Appl. No.: 17/756,474

(22) PCT Filed: Dec. 2, 2020

(86) PCT No.: PCT/US2020/062888
§ 371 (c)(1),
(2) Date: May 25, 2022

(87) PCT Pub. No.: WO2021/113361
PCT Pub. Date: Jun. 10, 2021

(65) Prior Publication Data
US 2023/0000487 A1 Jan. 5, 2023

Related U.S. Application Data

(60) Provisional application No. 62/942,948, filed on Dec. 3, 2019.

(51) Int. Cl.
A61B 17/072 (2006.01)
A61B 17/068 (2006.01)
(Continued)

(52) U.S. Cl.
CPC .......... *A61B 17/068* (2013.01); *A61B 17/072* (2013.01); *A61B 17/28* (2013.01);
(Continued)

(58) Field of Classification Search
CPC . A61B 17/068; A61B 17/0682; A61B 17/064; A61B 17/072; A61B 17/07207;
(Continued)

(56) References Cited

U.S. PATENT DOCUMENTS 5,176,702 A 1/1993 Bales et al.
5,345,949 A * 9/1994 Shlain ................ A61B 17/0682
604/101.03

(Continued)

OTHER PUBLICATIONS

International Search Report and Written Opinion issued in International Application No. PCT/US2020/062888, issued Mar. 2, 2021 (14 pages).

Primary Examiner — Scott A Smith
(74) Attorney, Agent, or Firm — Bookoff McAndrews, PLLC

(57) ABSTRACT

A medical device that includes a shaft having a proximal end and a distal end, the shaft defining a lumen extending from the proximal end of the shaft to an opening on a side of the shaft. The medical device includes a grasping tool proximate to the distal end of the shaft and configured to fix the distal end relative to a target site. The medical device further includes a lock at the proximal end of the shaft and configured to fix the proximal end to an ancillary device.

20 Claims, 6 Drawing Sheets

(51) Int. Cl.
*A61B 17/28* (2006.01)
*A61B 17/34* (2006.01)
*A61B 34/20* (2016.01)
*A61B 90/00* (2016.01)

(52) U.S. Cl.
CPC .............. *A61B 17/07207* (2013.01); *A61B 2017/07214* (2013.01); *A61B 17/34* (2013.01); *A61B 34/20* (2016.02); *A61B 90/00* (2016.02)

(58) Field of Classification Search
CPC ....... A61B 17/115; A61B 17/29; A61B 17/34; A61B 34/20; A61B 34/30; A61B 34/71; A61B 90/00; A61B 90/08; A61B 2017/00353; A61B 2017/00473; A61B 2017/00477; A61B 2017/07214; A61B 2017/07228; A61B 2017/2901; A61B 2017/2925; A61B 2017/2927; A61B 2017/2946; A61F 2/2427; A61F 2/2487
USPC .............. 227/19, 175.1, 175.2, 176.1, 180.1; 606/1, 139, 144, 151, 157, 219

See application file for complete search history.

(56) References Cited

U.S. PATENT DOCUMENTS

| | | | |
|---|---|---|---|
| 5,443,480 A | 8/1995 | Jacobs et al. | |
| 5,571,119 A * | 11/1996 | Atala | A61B 17/06109 606/144 |
| 5,976,159 A * | 11/1999 | Bolduc | A61B 17/064 606/151 |
| 6,260,552 B1 * | 7/2001 | Mortier | A61F 2/2487 600/16 |
| 6,346,074 B1 * | 2/2002 | Roth | A61F 2/2427 606/213 |
| 6,663,639 B1 * | 12/2003 | Laufer | A61B 17/0057 606/139 |
| 6,773,440 B2 * | 8/2004 | Gannoe | A61F 5/0086 606/157 |
| 7,083,630 B2 * | 8/2006 | DeVries | A61B 17/29 606/139 |
| 8,343,175 B2 | 1/2013 | Ewers et al. | |
| 2002/0062062 A1 * | 5/2002 | Belson | A61B 1/00055 600/141 |
| 2004/0147941 A1 * | 7/2004 | Takemoto | A61B 17/0483 606/144 |
| 2005/0043682 A1 | 2/2005 | Kucklick et al. | |
| 2010/0292724 A1 | 11/2010 | Ravikumar | |
| 2012/0123217 A1 | 5/2012 | Ramans et al. | |
| 2015/0133736 A1 | 5/2015 | Henzler et al. | |
| 2018/0092635 A1 | 4/2018 | Csiky | |

* cited by examiner

MEDICAL DEVICE PLACEMENT ASSEMBLIES AND METHODS OF USING THE SAME

CROSS-REFERENCE TO RELATED APPLICATIONS

This application is a National Stage under 35 U.S.C. § 371 of International Application No. PCT/US2020/062888, filed Dec. 2, 2020, which claims the benefit of priority from U.S. Provisional Application No. 62/942,948, filed Dec. 3, 2019, which are incorporated by reference herein in their entireties.

TECHNICAL FIELD

Various aspects of the disclosure relate generally to medical systems, devices, and related methods. More specifically, at least certain embodiments of the disclosure relate to systems, devices, and related methods for securely accessing and/or positioning one or more medical devices within a patient during a procedure, among other aspects.

BACKGROUND

Technological developments have given users of medical systems, devices, and methods, the ability to conduct increasingly complex procedures on subjects. One challenge in the field of minimally invasive surgeries such as endoscopy, laparoscopy, and thoracoscopy, among other surgical procedures, is associated with providing control of multiple medical devices with respect to an access and manipulation of such devices during a procedure. Placement of such medical devices within a patient may be difficult. Additionally, maintaining a desired position of a device after placement without requiring continued manual control of the device is unreliable. The limitations on medical devices that facilitate access of other devices into a patient for placement may prolong the procedure, limit its effectiveness, and/or cause injury to the patient due to device failure or breakage. There is a need for devices and methods that address one or more of these difficulties or other related problems.

SUMMARY

Aspects of the disclosure relate to, among other things, systems, devices, and methods for accessing a target treatment site with a medical apparatus fixed relative to the target treatment site, among other aspects. Each of the aspects disclosed herein may include one or more of the features described in connection with any of the other disclosed aspects.

According to an example, a medical device includes a shaft having a proximal end and a distal end, the shaft defining a lumen extending from the proximal end of the shaft to an opening on a side of the shaft. The medical device includes a grasping tool proximate to the distal end of the shaft and configured to fix the distal end relative to a target site. The medical device includes a lock at the proximal end of the shaft and configured to fix the proximal end to an ancillary device.

Any of the medical devices described herein may have any of the following features. The lock includes a threaded portion and an anchor nut coupled to the threaded portion. The anchor nut is rotatable and translatable relative to the threaded portion. The anchor nut is configured to engage the ancillary device and secure the shaft to the ancillary device in response to the anchor nut moving along the threaded portion toward the ancillary device. The medical device may include a valve at the proximal end of the shaft and configured to inhibit passage of fluid and/or gas from insufflation through the lumen from the opening to the proximal end. The valve is configured to allow passage of one or more devices through the lumen from the proximal end of the shaft to the opening of the shaft. The medical device may include a fastening device at the proximal end of the shaft and configured to fasten the one or more devices to the shaft. The opening is side-facing and proximal of the grasping tool. The shaft is rigid. The ancillary device includes a trocar or a port such that the lock is configured to fix the proximal end of the shaft to the trocar or the port. The grasping tool includes a clamp, and the medical device further comprises a handle at the proximal end of the shaft and configured to selectively actuate the grasping tool. The handle includes a lock mechanism configured to fix the handle in an actuated position to lock the grasping tool relative to the target site. The shaft includes an articulation joint proximal of the opening and configured to deflect the grasping tool and the opening relative to the proximal end of the shaft. The grasping tool includes a pair of forceps that are movable relative to the distal end of the shaft.

According to another example, a medical device includes a shaft defining a lumen that extends between a proximal opening at a proximal end of the shaft to a distal opening at a distal end of the shaft. The distal opening faces a side of the shaft. The medical device includes a grasping tool at the distal end of the shaft distal of the side opening and configured to engage a first object to fix the shaft to the first object. The medical device includes a lock at the proximal end of the shaft distal of the proximal opening, wherein the lock is configured to engage a second object to fix the shaft to the second object.

Any of the medical devices described herein may have any of the following features. The lock includes a threaded portion and an anchor nut configured to translate along the threaded portion in response to rotating about the threaded portion. The lock engages the second object when the anchor nut moves along the threaded portion and abuts against the second object. The medical device may include a fastening device and a valve at the proximal end of the shaft. The fastening device is configured to securely fasten the one or more devices to the shaft and the valve is configured to inhibit passage of fluid or gas through the lumen from the distal opening to the proximal opening of the shaft; and allow passage of one or more devices through the lumen from the proximal opening to the distal opening of the shaft.

According to another example, a method of securing a medical device to a target site, with the medical device including a shaft defining a lumen that extends between a proximal end of the shaft and a distal end of the shaft, includes inserting the shaft through an ancillary device to position the distal end of the shaft adjacent to the target site. The method includes actuating a grasping tool at the distal end of the shaft to fix the distal end to the target site, actuating a lock at the proximal end of the shaft to fix the proximal end to the ancillary device, and inserting a device through the lumen of the shaft at an opening on a side of the distal end of the shaft such that the device is positioned at the target site.

Any of the methods described herein may have any of the following features or steps. The ancillary device is a trocar at least partially received through a body of a patient. The target site is a cystic duct or a common bile duct of a patient.

It may be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate exemplary aspects of the disclosure and together with the description, serve to explain the principles of the disclosure.

DETAILED DESCRIPTION

Figure 1:
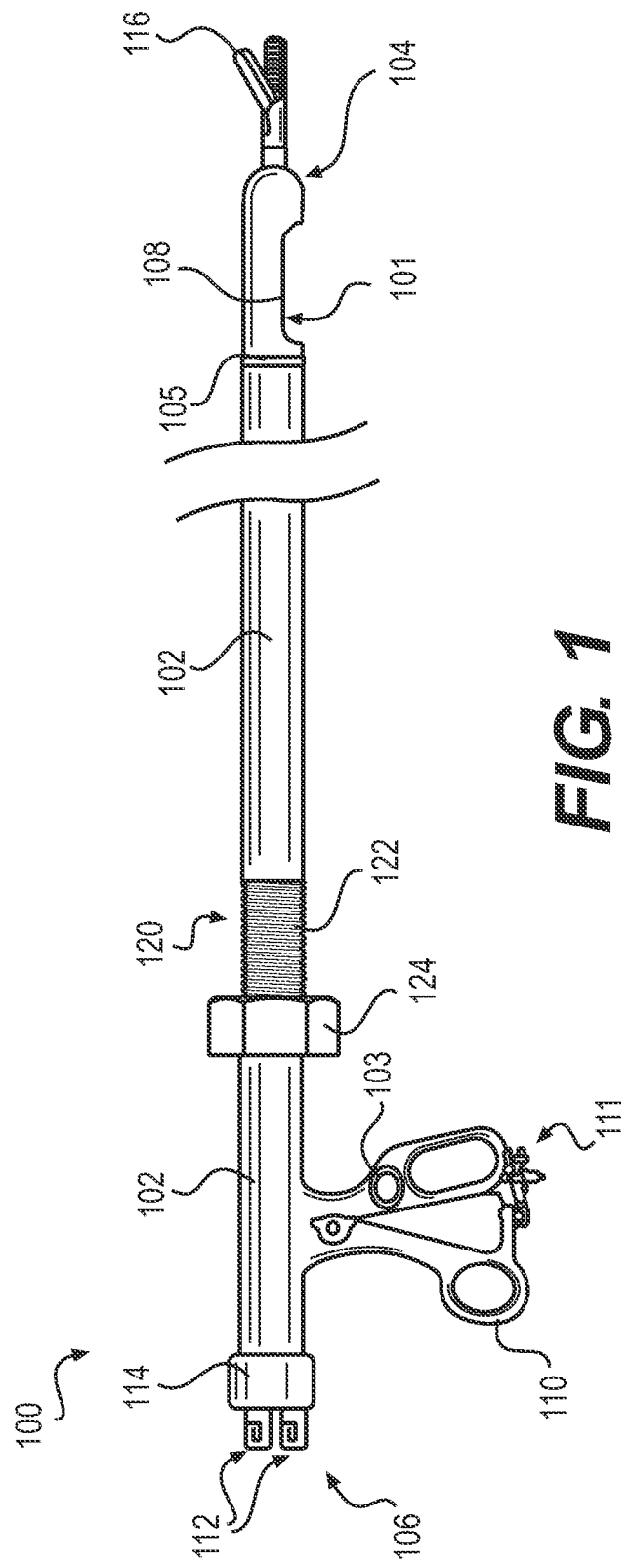
FIG. 1 is a side view of an exemplary medical device including a handle end and a grasping tool end, according to aspects of this disclosure.

Embodiments of the disclosure include systems, devices, and methods for operating multiple tools or other medical devices at a target site within the body, where the tools/devices generally require manual control or manipulation to access a target site, among other aspects. Reference will now be made in detail to aspects of the disclosure, examples of which are illustrated in the accompanying drawings. Wherever possible, the same or similar reference numbers will be used through the drawings to refer to the same or like parts. The term "distal" refers to a portion farthest away from a user when introducing a device into a patient. By contrast, the term "proximal" refers to a portion closest to the user when placing the device into the patient. As used herein, the terms "comprises," "comprising," or any other variation thereof, are intended to cover a non-exclusive inclusion, such that a process, method, article, or apparatus that comprises a list of elements does not necessarily include only those elements, but may include other elements not expressly listed or inherent to such process, method, article, or apparatus. The term "exemplary" is used in the sense of "example," rather than "ideal." As used herein, the terms "about," "substantially," and "approximately," indicate a range of values within +/−10% of a stated value.

Embodiments of the disclosure may be used to facilitate a placement and positioning of ancillary medical tools/devices at a target treatment site by providing one or more mechanisms and/or assemblies for securing said tools/devices at the target treatment site. For example, some embodiments combine a lock assembly and a grasping tool assembly on a medical device to secure the device to a target treatment site and facilitate access of ancillary tools/devices thereto. The lock assembly may include a threaded portion disposed along a shaft of the medical device and an anchor nut movably coupled to the threaded portion. The anchor nut may translate and rotate relative to the threaded portion to engage a first object, such as, for example, an ancillary device that the medical device is received through to secure the medical device thereto. The grasping tool assembly may include a pair of forceps that are movable relative to a shaft of the medial device. The pair of forceps may move toward one another to engage a second object, such as, for example, a tissue of a patient to secure the medical device thereto.

Embodiments of the disclosure may relate to devices and methods for performing various medical procedures and/or treating portions of the large intestine (colon), small intestine, cecum, esophagus, any other portion of the gastrointestinal tract, and/or any other suitable patient anatomy (collectively referred to herein as a "target treatment site"). The device and related methods may be used laparoscopically or endoscopically, or in any other open or minimally invasive procedure, including thorascopic and ENT procedures. Reference will now be made in detail to examples of the present disclosure described above and illustrated in the accompanying drawings. Wherever possible, the same reference numbers will be used throughout the drawings to refer to the same or like parts.

FIG. 1 shows a schematic depiction of an exemplary medical device 100 in accordance with an embodiment of this disclosure. The medical device 100 may include a shaft 102 having a distal end 104 and a proximal end 106 and has a longitudinal length between by the distal end 104 and the proximal end 106. The shaft 102 is formed of a rigid material (e.g. plastic) and, in at least some embodiments, is straight without bends. Although not shown, it should be appreciated that in some embodiments the shaft 102 may include a bend along a longitudinal length between the proximal end 106 and the distal end 104. In other embodiments, shaft 102 may be formed of a flexible material such that shaft 102 may be configured to selectively bend at various locations along a longitudinal length of shaft 102. As described in greater detail below, at least a portion of the shaft 102 may be configured to selectively move (e.g., deflect) relative to a longitudinal length of the shaft 102. A longitudinal length of the shaft 102 may range from approximately 25 centimeters to approximately 30 centimeters, however, it should be understood that the shaft 102 may include various other sizes and/or lengths than those shown and described herein.

The shaft 102 of the medical device 100 further includes a distal opening 108 along a side of the shaft 102 adjacent to the distal end 104. In embodiments, the side-facing distal opening 108 is positioned proximally relative to the distal end 104. It should be understood that the distal opening 108 may be positioned along various other sides and/or locations along a longitudinal length of the shaft 102 than those shown and described herein. The distal opening 108 is sized and shaped to receive one or more tools/devices therethrough via a lumen 101 extending through the shaft 102.

The shaft 102 of the medical device 100 further includes a proximal opening (not shown) at the proximal end 106 and in fluid communication with the distal opening 108 via the shaft 102. In embodiments, the shaft 102 defines the lumen 101 extending from the proximal opening at the proximal end 106 to the distal opening 108. As described in greater detail below, the shaft 102 of the medical device 100 is sized and shaped to be received within an ancillary device, and the lumen 101 of the shaft 102 is sized and shaped to receive one or more tools/devices therein. By way of example only, in some embodiments the shaft 102 of the medical device 100 may include an outer diameter of approximately 5 millimeters and the lumen 101 may include an inner diameter of approximately 3.8 millimeters. In this instance, and as described in greater detail below, the shaft 102 of the medical device 100 may be operable to be received within a lumen of an ancillary device, such as, for example, a trocar or port having a lumen with a diameter of approximately 5 millimeters.

Still referring to FIG. 1, the medical device 100 further includes a handle 110 positioned adjacent to the proximal end 106 of the shaft 102. In embodiments, the handle 110 includes a pair of manually operable actuators pivotably coupled to one another about a pivot point. The pair of manually operable actuators of the handle 110 may be in the form of a scissor-type handle where each of the pair of manual actuators includes an aperture sized and shaped to receive at least one finger of a user therethrough. The apertures in the pair of manual actuators of the handle 110 are configured to facilitate manual actuation of the handle 110 by a hand of a user. It should be appreciated that the handle 110 may include various suitable forms of actuators other than those shown and described herein. The handle 110 of the medical device 100 includes a lock mechanism 111 that is configured to selectively fix the pair of manually operable actuators to one another. In some embodiments, the lock mechanism 111 includes a ratchet lock, a slide lock, and/or other various suitable mechanisms for locking the handle 110 to a fixed position.

Figure 3A:
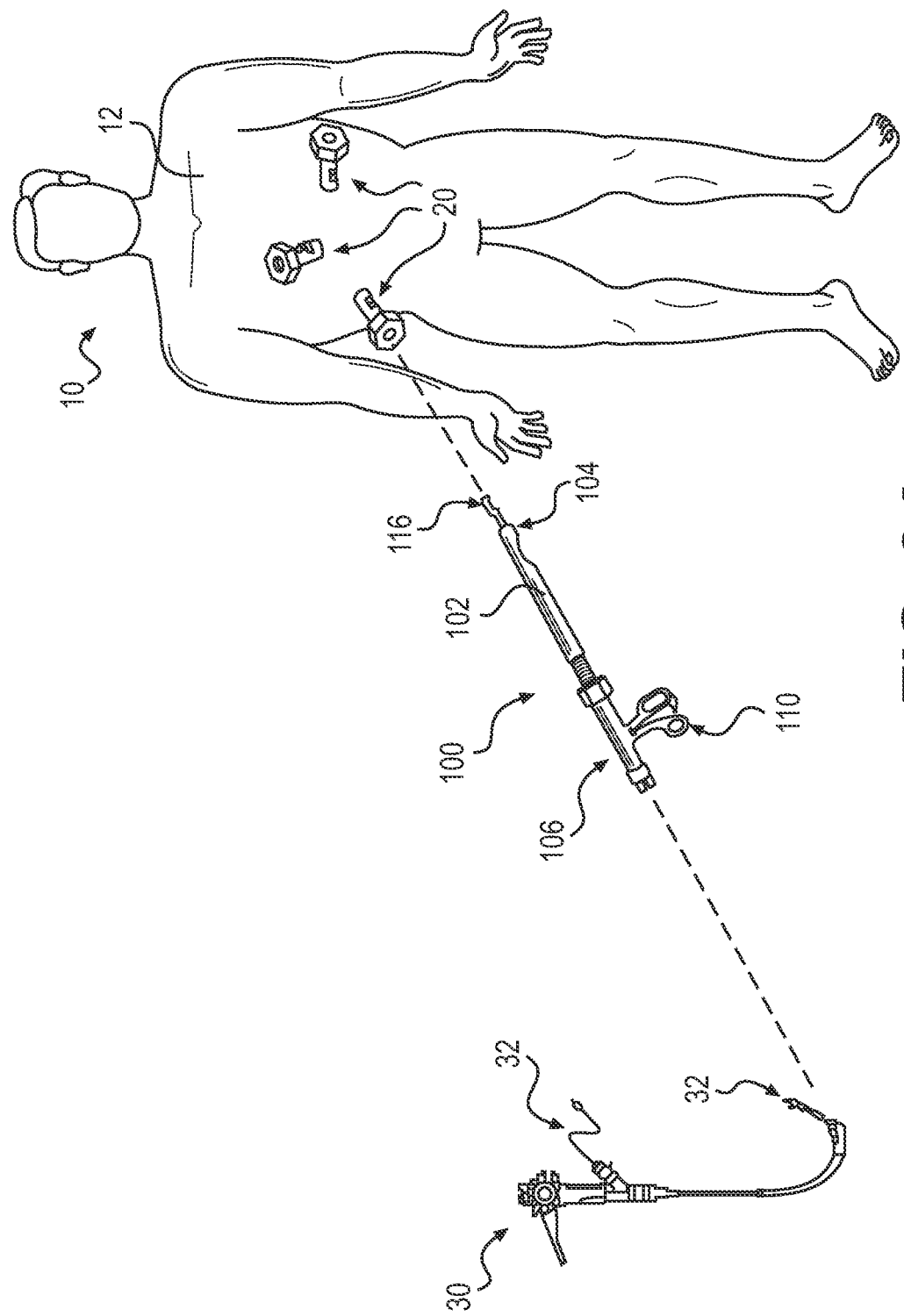
FIG. 3A is a perspective view of the medical device of FIG. 1 for use in a patient, according to aspects of this disclosure.

The medical device 100 further includes a grasping tool 116 at the distal end 104 of the shaft 102 that is selectively actuatable by the handle 110. In embodiments, the grasping tool 116 includes a pair of forceps and/or clamps extending distally from the distal end 104 of the shaft 102, where the pair of forceps and/or clamps are movable relative to one another in response to actuation of the handle 110. For example, in some embodiments, the handle 110 may be movably coupled to the grasping tool 116 by one or more control wires or cables extending through the lumen 101 of the shaft 102 (or another lumen of the shaft 102) between the pair of manually operable actuators of the handle 110 and the pair of forceps of the grasping tool 116. Accordingly, the handle 110 is configured and operable to generate a pushing force and a pulling force on the grasping tool 116 to selectively actuate the grasping tool 116 from an open position (FIG. 1) to a closed position (FIG. 3D).

In some embodiments, the grasping tool 116 may be removably coupled to the distal end 104 of the shaft 102 such that the grasping tool 116 is selectively replaceable. In other embodiments, the grasping tool 116 may be integral with the distal end 104 of the shaft 102 such that the grasping tool 116 is fixed thereto. It should be understood that in other embodiments the grasping tool 116 may include various other suitable graspers and/or tools configured to hold onto a portion of an anatomy. Accordingly, the lock mechanism 111 is operable to maintain the grasping tool 116 at a fixed position, such as, for example, an open state (FIG. 1) and a closed state (FIG. 3D), in response to locking the pair of manually operable actuators of the handle 110 to one another.

The medical device 100 further includes an articulation joint 105 on the shaft 102 adjacent to the distal end 104, and more specifically the articulation joint 105 is positioned proximally relative to the distal opening 108. The articulation joint 105 is configured to selectively move, bend, flex, pivot and/or deflect the distal end 104 of the shaft 102 relative to the proximal end 106 of the shaft 102, in response to an articulation of the articulation joint 105. In some embodiments, the articulation joint 105 may be further configured to rotate a portion of the shaft 102 distal to the articulation joint 105 about the portion of the shaft 102 proximal to the articulation joint 105, such that the distal opening 108, the distal end 104, and the grasping tool 116 are operable to rotate relative to the proximal end 106 of the shaft 102. The handle 110 of the medical device 100 includes an actuator 103 that is configured and operable to actuate the articulation joint 105. In some embodiments, the actuator 103 may include a wheel, a button, a roller, a ball, a lever and/or various other suitable actuators.

Still referring to FIG. 1, the medical device 100 may include one or more fastening devices 112 and a valve 114 at the proximal end 106 of the shaft 102. The one or more fastening devices 112 of the medical device 100 are each configured to secure an ancillary tool/device to the proximal end 106 of the shaft 102. As described above, the medical device 100 is configured to receive one or more tools/devices through the lumen 101 of the shaft 102 from the proximal opening at the proximal end 106 to the distal opening 108. Accordingly, the one or more fastening devices 112 are operable to fasten at least a portion (e.g., a proximal end) of an ancillary tool/device (e.g., a guidewire) to the medical device 100 as the ancillary tool/device is received within the lumen 101 and extended through the distal opening 108 for use during a procedure. In some embodiments, the fastening device(s) 112 may include a hook, a notch, a clasp, and/or various other suitable fasteners for securing a tool/device to the shaft 102. In embodiments, the fastening devices may be similar to the locking device of the RX Biliary System™ manufactured and sold by Boston Scientific Corporation.

The valve 114 of the medical device 100 is configured to provide passage of the one or more ancillary tools/devices secured to and received through the shaft 102 from the proximal opening at the proximal end 106. In some embodiments, the valve 114 defines the proximal opening at the proximal end 106 and may include a coating that is operable to facilitate an inner surface at the proximal opening that promotes passage of the one or more ancillary tools/devices. For example, the valve 114 may be coated with a lubricant (e.g., Silicone) and/or various other materials capable of generating a smooth interface and/or minimizing frictional forces at the proximal opening. In some embodiments, the valve 114 may include one or more triangular segments (not shown) to provide a door and/or barrier at the proximal opening of the lumen 101. For example, the valve 114 may have a tricuspid design of three triangular segments/flaps for closing the proximal opening at the proximal end 106. In this instance, the triangular segments of the valve 114 are configured to selectively open, to facilitate access to the proximal opening of the lumen 101, in response to receiving a predetermined insertion force thereon.

Still referring to FIG. 1, the valve 114 of the medical device 100 may be further configured to inhibit leakage, i.e. a passage of various fluids, liquids, etc. through the lumen 101 of the shaft 102 from the distal opening 108 to the proximal opening at the proximal end 106, such as, for example, fluids that may be received from a target treatment site during a use of the medical system 100 in a procedure. In embodiments in which the valve 114 includes the tricuspid design detailed above, the triangular segments/flaps of the valve 114 may be operable to inhibit access to the proximal opening from the distal opening 108 via the lumen 101. The medical device 100 further includes a lock assembly 120 positioned along a longitudinal length of the shaft 102 between the distal end 104 and the proximal end 106. In embodiments, the lock assembly 120 is positioned proximal of the distal opening 108 and distal of the handle 110, however, it should be understood that in other embodiments the lock assembly 120 may be positioned along various other locations of the shaft 102.

The lock assembly 120 of the medical device 100 may include a threaded portion 122 and an anchor nut 124. The threaded portion 122 of the lock assembly 120 is disposed about an exterior surface of the shaft 102 and is formed along at least a portion of a longitudinal length of the shaft 102. It should be appreciated that the threaded portion 122 of the lock assembly 120 may be formed of one or more threads extending radially outward from an exterior surface of the shaft 102. The anchor nut 124 of the lock assembly 120 is generally hexagonally-shaped and includes a channel formed therethrough. The channel of the anchor nut 124 is sized and shaped relatively greater than an outer diameter of the threaded portion 122 such that the anchor nut 124 is configured to receive the threaded portion 122 through the channel. It should be appreciated that the channel of the anchor nut 124 may be formed of one or more threads extending radially inward from an interior surface of the channel of the anchor nut 124. Accordingly, the threaded portion 122 of the lock assembly 120 is configured to mate and/or mesh with the corresponding one or more threads included along the channel of the anchor nut 124.

Still referring to FIG. 1, the anchor nut 124 of the lock assembly 120 is movably coupled to the threaded portion 122 such that, in response to actuation of the lock assembly 120, the anchor nut 124 is configured to move relative to the threaded portion 122. In embodiments, the anchor nut 124 is configured to rotate about the threaded portion 122 and translate along the threaded portion 122 in response to actuation of the lock assembly 120. In some embodiments, rotation of the anchor nut 124 about and/or relative to the threaded portion 122 may provide simultaneous translation of the anchor nut 124 along and/or relative to the threaded portion 122. It should be understood that the threaded portion 122 and/or the anchor nut 124 of the lock assembly 120 may include various other suitable sizes, shapes, and/or configurations than those shown and described herein without departing from a scope of the present disclosure. For example, in other embodiments the locking assembly 120 may include a spring grasping tool, a friction fit, and/or various other suitable locking assemblies.

As described in greater detail below, the anchor nut 124 is configured to engage an object positioned adjacent to the threaded portion 122 in response to moving the anchor nut 124 relative to the threaded portion 122 and toward the object, such as, for example, an ancillary device (see FIG. 3B). In embodiments, the lock assembly 120 is manually actuatable by a user of the medical device 100 in response to physically rotating the anchor nut 124 relative to the threaded portion 122. In other embodiments, the lock assembly 120, and more specifically the anchor nut 124, may be actuatable in response to actuating the handle 110 and/or various other suitable actuators included on the medical device 100. In further embodiments, the medical device 100 may include an actuator, such as, for example, a depressible button positioned along the anchor nut 124. The actuator may be configured to selectively engage the anchor nut 124 to the threaded portion 122. For example, the actuator may be actuated (e.g., depressed) to disengage the one or more threads located along an interior surface of the anchor nut 124 from the threaded portion 122. In this instance, with the actuator in an actuated state, the anchor nut 124 may be permitted to move (e.g. translate) relative to the threaded portion 122. In some embodiments, the actuator may facilitate translation of the anchor nut 124 relative to the threaded portion 122 without requiring simultaneous rotation of the anchor nut 124.

Figure 2:
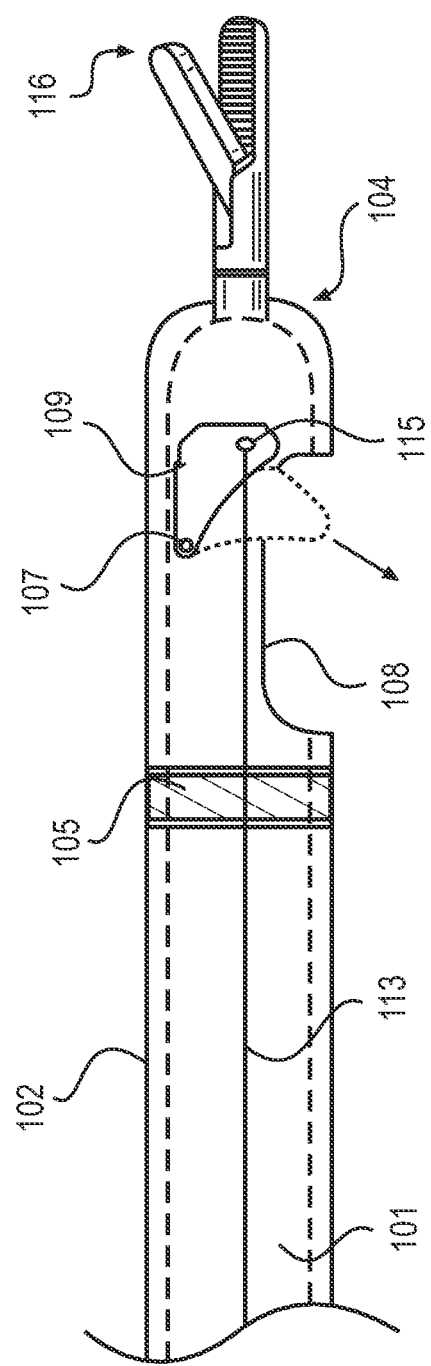
FIG. 2 is a partial side view of the grasping tool end of the medical device of FIG. 1, according to aspects of this disclosure.

Referring now to FIG. 2, in some embodiments the medical device 100 may further include an elevator 109 and a control wire 113 disposed within the lumen 101 of the shaft 102. The elevator 109 of the medical device 100 is movably coupled to the shaft 102 at a pivot point 107 such that the elevator 109 is configured to move relative to the lumen 101 about the pivot point 107. The control wire 113 of the medical device 100 has a longitudinal length defined by a proximal end (not shown) and a distal end that is coupled to the elevator 109 at a connection point 115 that is positioned on the elevator 109 at an end opposite of the pivot point 107. The control wire 113 extends through the lumen 101 of the shaft 102 from the proximal end 106 to the distal end 104. A proximal end of the control wire 113 connects to a rotatable knob, trigger, spool, or other actuator at the handle 110 or otherwise at the proximal end 106 of the shaft 102.

The control wire 113 is configured to move the elevator 109 from an unactuated position, where the elevator 109 is fully disposed within the lumen 101, to an actuated position where the elevator 109 extends outwardly from the distal opening 108. In embodiments, in response to applying a pulling force at a proximal end of the control wire 113 (via the knob, trigger, spool, or other actuator), the distal end of the control wire 113 is retracted proximally relative to the lumen 101 thereby causing the elevator 109 to pivot about the pivot point 107. In this instance, with a distal end of the control wire 113 coupled to the elevator 109 at the connection point 115, pulling the control wire 113 proximally provides movement of the connection point 115 in a proximal direction toward the proximal end 106, thereby transitioning the elevator 109 from the unactuated position to the actuated position. In other embodiments, the elevator 109 may be fixed relative to the lumen 101 of the shaft 102 such that the elevator 109 is maintained in a position so that an inclined/ramped surface of the elevator 109 leads to, or at least partially extends out from, the distal opening 108 (e.g. the actuated position). In this instance, the control wire 113 may be omitted entirely from the medical device 100. As described in greater detail herein, the elevator 109 is configured to position one or more tools/devices received through the lumen 101 of the shaft 102 outward from the distal opening 108 when in the actuated position (see FIG. 3D).

According to an example method of using the medical device 100, the medical device 100 may be utilized during a Laparoscopic Transcystic Common Bile Duct Exploration procedure (LTCBDE), a laparoscopic cholecystectomy procedure, and/or various other procedures as described further herein. In embodiments, referring now to FIG. 3A, the distal end 104 of the shaft 102 may be inserted into one or more ancillary devices 20, where the one or more ancillary devices 20 may be trocars and/or ports that are inserted into a body 12 of a patient 10 and configured to facilitate access to a target treatment site (e.g., the common bile duct) within the body 12. The three trocars 20 may be used in a laparoscopic procedure. In such a procedure, the other two trocars 20 may receive other therapeutic or diagnostic tools/devices 32, including, for example, imaging devices.

As discussed in greater detail above, the shaft 102 of the medical device 100 is sized and shaped in accordance with a size of the ancillary device 20 to permit insertion of the medical device 100 therethrough. Additionally, the proximal end 106 of the shaft 102 may receive one or more tools/devices 30, 32 into the lumen 101 via the proximal opening at the proximal end 106. In embodiments, the one or more tools/devices 30, 32 may be an endoscope, a catheter, a guidewire, and/or the any other therapeutic or diagnostic device for use at the target treatment site within the body 12 of the patient 10. As discussed in greater detail above, at least a portion of the one or more tools/devices 30, 32 (e.g., a proximal end) may be secured to the shaft 102 at the proximal end 106 via the one or more fastening devices 112 located thereon.

Figure 3B:
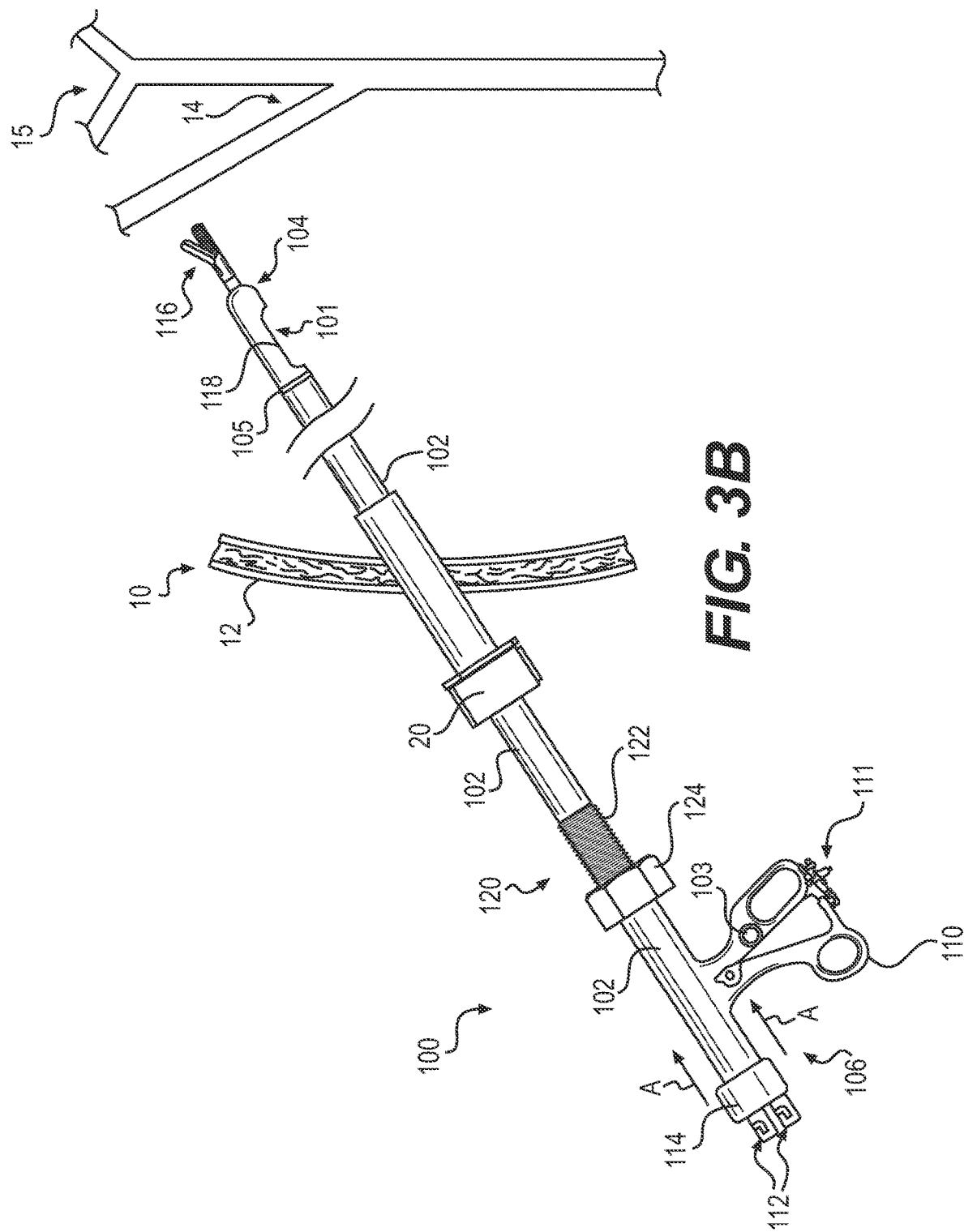
FIG. 3B is a side view of the medical device of FIG. 1 partially received within a patient and in a disengaged state with an ancillary device, according to aspects of this disclosure.

Referring now to FIG. 3B, the medical device 110 is depicted partially disposed into the body 12 of the patient 10 via the ancillary device 20 (e.g., trocar). In this instance, the distal end 104 of the shaft 102 extends into the body 12 and the grasping tool 116 is positioned relatively far from a target treatment site, such as, for example, a cystic duct 14 and a common bile duct 15 of the patient 10. The lock assembly 120 of the medical device 100 is positioned proximal relative to the ancillary device 20 such that the threaded portion 122 and the anchor nut 124 are linearly displaced from the ancillary device 20. In this instance, the medical device 100 may be moved in a direction A to position the grasping tool 116 closer to the target treatment site (e.g., the cystic duct 14). It should be appreciated that the shaft 102 may be manually maneuvered by a user of the medical device 100 in response to grasping the handle 110 at the proximal end 106.

Figure 3C:
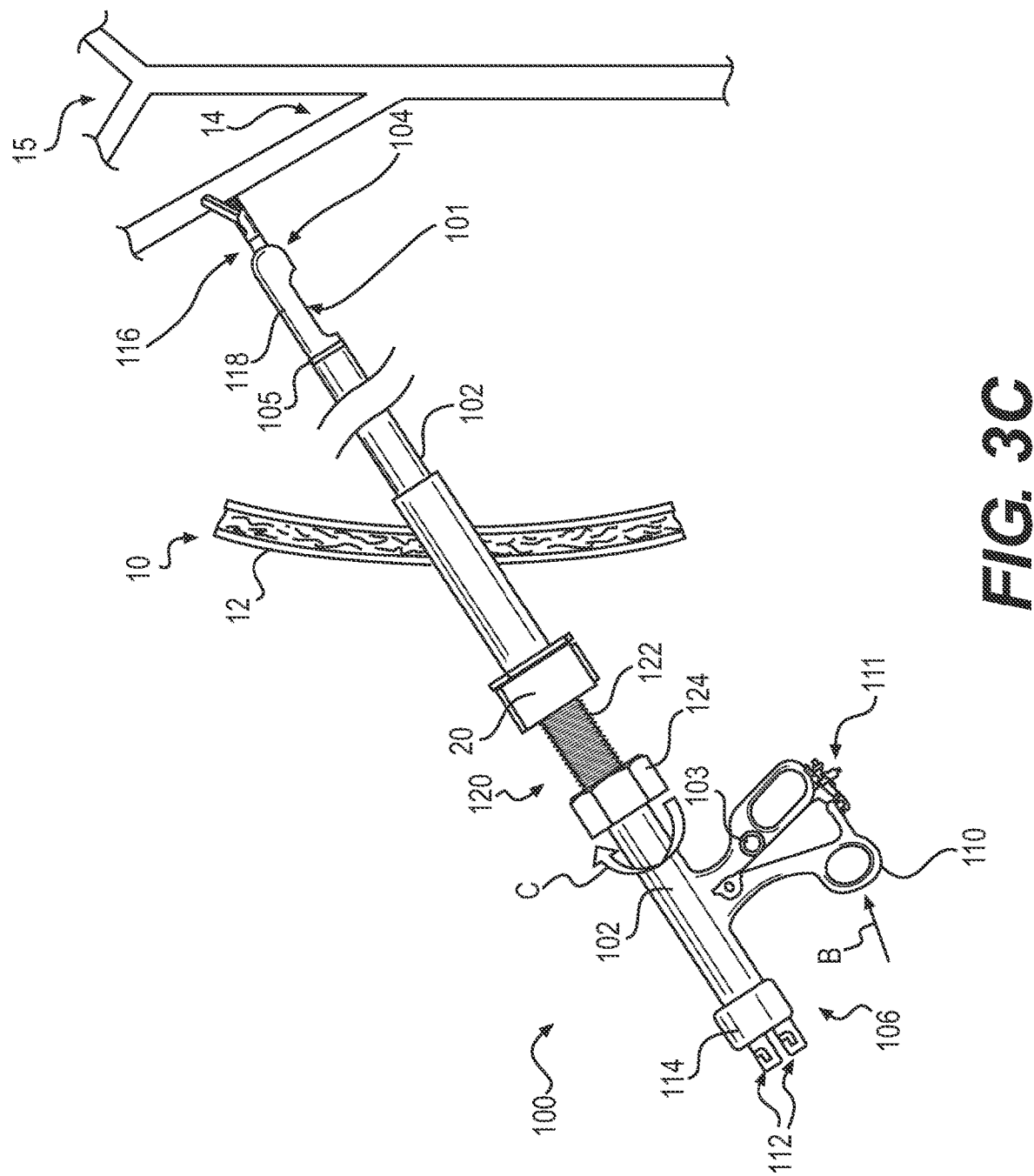
FIG. 3C is a side view of the medical device of FIG. 1 partially received within a patient with the grasping tool end positioned adjacent to a target site, according to aspects of this disclosure.
Figure 3D:
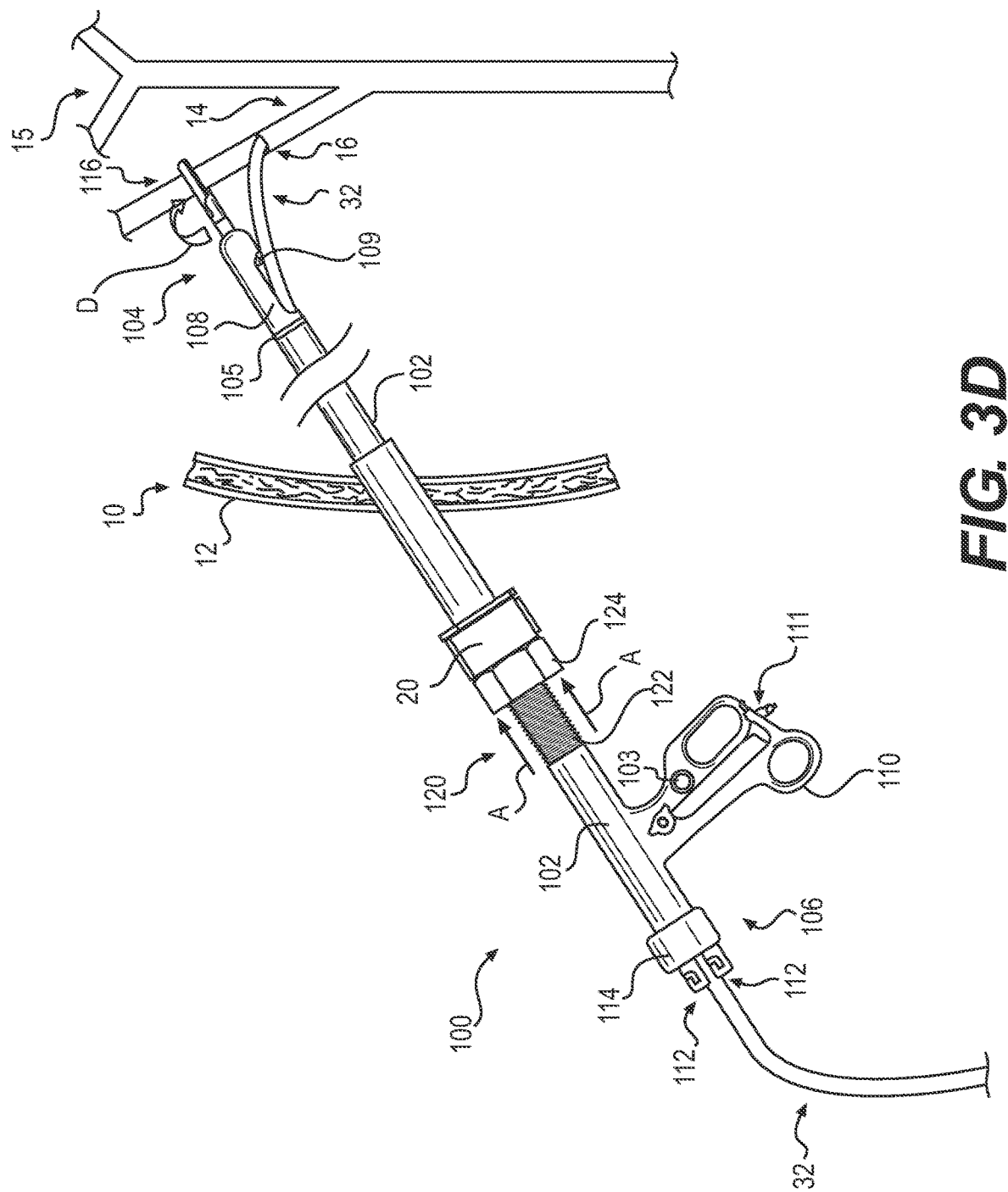
FIG. 3D is a side view of the medical device of FIG. 1 partially received within a patient and in an engaged state with an ancillary device with the grasping tool end secured to the target site, according to aspects of this disclosure.

Referring now to FIG. 3C, with the shaft 102 of the medical device 100 translated into the body 12 to a further extent than that shown and described above in FIG. 3B, the grasping tool 116 may be positioned at the cystic duct 14 of the patient 10. In this instance, the handle 110 of the medical device 100 may be manually manipulated to actuate the grasping tool 116 of the medical device 100. Movement of the handle 110 in a direction B may provide actuation of the grasping tool 116, thereby causing the pair of forceps of the grasping tool 116 to move toward one another. Further, the lock assembly 120 of the medical device 100 may be positioned adjacent to the ancillary device 20 such that at least a portion of the threaded portion 122 may be at least partially collinear with an outer body of the ancillary device 20. In other words, at least a portion of the threaded portion 122 may be received and/or disposed within a lumen of the ancillary device 20.

In this instance, the anchor nut 124 may be manually manipulated to actuate the lock assembly 120 of the medical device 100. In embodiments, rotation of the anchor nut 124 in a direction C (e.g., clockwise, counterclockwise, etc.) about and/or relative to the threaded portion 122 may provide actuation of the lock assembly 120, thereby causing the anchor nut 124 to move distally along the threaded portion 122. In embodiments, the anchor nut 124 is configured to translate linearly along the threaded portion 122 in a distal direction toward the distal end 104 in response to rotation of the anchor nut 124 about the threaded portion 124.

Referring now to FIG. 3D, the grasping tool 116 of the medical device 100 is secured to the target treatment site (e.g., the cystic duct 14) of the patient 10 as the pair of forceps of the grasping tool 16 are engaged to one another with at least a portion of the cystic duct 14 received therebetween. In this instance, the medical device 100 is secured to a first object, the cystic duct 14, at the distal end 104. Additionally, the lock assembly 120 of the medical device 100 is secured to the ancillary device 20 (e.g., a trocar) as the anchor nut 124 is engaged to an outer body of the ancillary device 20. In embodiments, the anchor nut 124 abuts against an outer body of the ancillary device 20 in response to a linear translation of the anchor nut 124 relative to the threaded portion 122 and toward the ancillary device 20 in the direction A. It should be understood that an engagement of the anchor nut 124 with the ancillary device 20 may form frictional contact therebetween. In this instance, the medical device 100 is secured to a second object, the ancillary device 20, at the proximal end 106.

The distal end 104 of the shaft 102 may retain a fixed engagement with the body 12 of the patient 10 while the grasping tool 116 is engaged to the target treatment site. The pair of forceps of the grasping tool 116 remains engaged to one another, with the cystic duct 14 positioned therebetween, by maintaining the handle 110 in the actuated position shown in FIG. 3D. In some embodiments, a user of the medical device 100 may actuate the lock mechanism 111 to secure the pair of manually operable actuators of the handle 110 to one another. Accordingly, a user of the medical device 100 is permitted to manually disengage the handle 110 (e.g., by removing a hand of the user from the handle 110) without causing the grasping tool 116 to disengage the cystic duct 14 as the lock mechanism 111 is configured to lock the handle 110 in the actuated position. Grasping of a target treatment site (e.g., the cystic duct 14) may thereby be maintained without requiring continuous manual control of the handle 110 of the medical device 100. Thus, with the handle 110 in a fixed position, the grasping tool 116 is similarly maintained in a fixed position without requiring continued manual control of the medical device 100 by a user.

The proximal end 106 of the shaft 102 may retain a fixed engagement with the body 12 of the patient 10 while the locking assembly 120 is engaged to the ancillary device 20. The anchor nut 124 remains engaged to an outer body of the ancillary device 20 (e.g., a trocar), with the ancillary device 20 securely fixed relative to the body 12 of the patient 10, by maintaining the anchor nut 124 at the actuated position relative to the threaded portion 122, as shown in FIG. 3D. In some embodiments, at least a portion of the threaded portion 122 received within the ancillary device 20 may be radially expandable to further engage the lock assembly 120 to the ancillary device 20. For example, an actuator on the handle 110 of the medical device 100 may be actuated by a user to selectively expand the threaded portion 122. In this instance, with the threaded portion 122 disposed within the ancillary device 20, expansion of the threaded portion 122 of the lock assembly 120 may fix the medical device 100 axially and rotationally relative to the ancillary device 20 and/or the body 12 of the patient 10.

By way of illustrative example, in some embodiments, the lock assembly 120 may be configured such that the metallic threads forming the threaded portion 122 may be expandable. In other embodiments, by way of further example, the lock assembly 120 may include a balloon disposed along at least a portion of the threaded portion 122 such that the balloon of the lock assembly 120 may be expandable. It should be understood that the ancillary device 20 may be secured to the body 12 of the patient 10 prior to an insertion of the medical device 100 therethrough. In some instances, an outer body of the ancillary device (e.g., a trocar) may abut against the body 12 of the patient 10 (e.g., the skin of the patient 10) along an opposing end opposite of the anchor nut 124, thereby fixing a relative position of the ancillary device 20 to the body 12.

Accordingly, a user of the medical device 100 is permitted to manually disengage the handle 110 (e.g., by removing a hand of the user from the handle 110) without causing the shaft 102 to disengage from the body 12 of the patient 10, as the locking assembly 120 is configured to lock the shaft 102 to the ancillary device 20. A depth of the medical device 100 relative to the body 12 of the patient 10 and/or a target treatment site (e.g., the cystic duct 14) may thereby be maintained without requiring continuous manual control of the medical device 100. Thus, with the locking assembly 120 fixed relative to the ancillary device 20, the shaft 102 is similarly maintained in a fixed position without requiring continued manual control of the medical device 100 by a user.

Still referring to FIG. 3D, with the distal end 104 and the proximal end 106 of the medical device 100 secured to a first object (e.g., the cystic duct 14) and a second object (e.g., the ancillary device 20), respectively, a user of the medical device 100 may remove one or more hands of the user from engagement with the medical device 100 for other uses during a procedure. By way of example only, a user of the medical device 100 may manually control one or more other tools/devices for use with the medical device 100 during a procedure. In embodiments, the tool/device 32 is received through the lumen 101 of the shaft 102 from the proximal opening at the proximal end 106 and extended outwardly therefrom at the distal opening 108. The tool/device 32 is deflected from the lumen 101 of the shaft 102 by the elevator 109 disposed within the lumen 101 adjacent to the distal opening 108.

The tool/device 32 is depicted extending outwardly from the distal opening 108 of the shaft 120 in response to the elevator 109 engaging a body of the tool/device 32. With the elevator 109 in an actuated position, an anterior-facing surface of the elevator 109 engages a body of the tool/device 32 to thereby deflect a distal end of the tool/device 32 laterally outward from the distal opening 108. In some embodiments, the anterior-facing surface of the elevator 109 has a curvature that facilitates a deflection and/or bend of a body of the tool/device 32. It should be appreciated that the elevator 109 may include various other shapes, sizes, and/or configurations than those shown and described herein without departing from a scope of the disclosure.

Still referring to FIG. 3D, with the tool/device 32 exiting the lumen 101 of the shaft 102 at the distal opening 108, a distal end of the tool/device 32 is positioned adjacent to the target treatment site (e.g., the cystic duct 14). Accordingly, a user may manually control a distal end of the tool/device 32 to perform one or more procedures at the target treatment site due to the enhanced control of said tool/device 32 provided by the medical device 100. By way of illustrative example only, the tool/device 32 may be used to create or enter an incision 16 at the cystic duct 14 for extracting one or more items, such as, a gallstone from the cystic duct 14 or the common bile duct 15. It should be understood that in other instances the distal end 104, the distal opening 106, and the grasping tool 116 may be reoriented relative to a target treatment site prior to securing the medical device 100 thereto, such as, for example, actuating the actuator 103 to thereby articulate the articulation joint 105. As described in greater detail above, the articulation joint 103 may be configured to move, bend, flex, pivot, deflect and/or rotate the distal end 104 of the shaft 102 relative to the proximal end 106 for purposes of positioning the distal opening 108 and/or the grasping tool 116 adjacent to a target treatment site during a procedure.

In other examples, the medical device 100 may facilitate directing the tool/device 32 (e.g., a catheter, a camera system, etc.) into regions of a patient's anatomy that are generally difficult to access, such as, for example, behind folds of a bowel, areas within a pelvis, spaces around the lungs, and/or other structures in the thoracic cavity. The medical device 100 may be utilized to access other structures during laparoscopic and thorascopic procedures, including, but not limited to, a colon, ureters, fallopian tubes, vasculature, lymphatic ducts, lung nodules or air sacs, and more.

Each of the aforementioned devices, assemblies, and methods may be used to facilitate access to a target treatment site and provide enhanced control of ancillary tools/devices. By providing a medical device with a grasping tool and locking assembly, a user may interact with a target treatment site using a plurality of tools/devices during a procedure without requiring continued manual control of the medical device. In this instance, a user may reduce overall procedure time, increase efficiency of procedures, and/or avoid unnecessary harm to a patient's body caused by limited control of the ancillary tools/devices.

It will be apparent to those skilled in the art that various modifications and variations may be made in the disclosed devices and methods without departing from the scope of the disclosure. Other aspects of the disclosure will be apparent to those skilled in the art from consideration of the specification and practice of the features disclosed herein. It is intended that the specification and examples be considered as exemplary only.

We claim:

1. A medical device comprising:
a shaft having a proximal end and a distal end, the shaft defining a lumen extending from the proximal end of the shaft to an opening on a side of the shaft;
a grasping tool fixed to the distal end of the shaft and configured to fix the distal end relative to a target site; and
a lock assembly disposed at the proximal end of the shaft and configured to engage with an ancillary device and prevent distal axial movement of the shaft relative to the ancillary device.

2. The medical device of claim 1, wherein the lock assembly includes a threaded portion and an anchor nut coupled to the threaded portion.

3. The medical device of claim 2, wherein the anchor nut is rotatable and translatable relative to the threaded portion.

4. The medical device of claim 3, wherein the anchor nut is configured to engage the ancillary device and secure the shaft to the ancillary device in response to linear translation of the anchor nut toward the ancillary device.

5. The medical device of claim 1, further comprising a valve at the proximal end of the shaft and configured to inhibit passage of fluid and/or gas from insufflation through the lumen from the opening to the proximal end.

6. The medical device of claim 5, wherein the valve is configured to allow passage of one or more devices through the lumen from the proximal end of the shaft to the opening of the shaft.

7. The medical device of claim 6, further comprising a fastening device at the proximal end of the shaft and configured to fasten the one or more devices to the shaft.

8. The medical device of claim 1, wherein the opening is side-facing and proximal of the grasping tool.

9. The medical device of claim 1, wherein the shaft is rigid.

10. The medical device of claim 1, wherein the ancillary device includes a trocar or a port such that the lock assembly is configured to engage with the trocar or the port.

11. The medical device of claim 1, wherein the grasping tool includes a clamp, and the medical device further comprises a handle at the proximal end of the shaft and configured to selectively actuate the grasping tool.

12. The medical device of claim 11, wherein the handle includes a lock mechanism configured to fix the handle in an actuated position to lock the grasping tool relative to the target site.

13. The medical device of claim 1, wherein the shaft includes an articulation joint proximal of the opening and configured to deflect the grasping tool and the opening relative to the proximal end of the shaft.

14. The medical device of claim 1, wherein the grasping tool includes a pair of forceps that are movable relative to the distal end of the shaft.

15. A medical device, comprising:
   a shaft defining a lumen that extends between a proximal opening at a proximal end of the shaft to a distal opening at a distal end of the shaft, wherein the distal opening faces a side of the shaft;
   a grasping tool fixed to the distal end of the shaft and distal of the distal opening, wherein the grasping tool is configured to engage a first object to fix the shaft to the first object; and
   a lock assembly disposed at the proximal end of the shaft and distal of the proximal opening, wherein the lock assembly is configured to engage with a second object to prevent distal axial movement of the shaft relative to the second object.

16. The medical device of claim 15, wherein the lock assembly includes a threaded portion and an anchor nut configured to translate along the threaded portion in response to rotating about the threaded portion; and
   wherein the lock assembly engages the second object when the anchor nut moves along the threaded portion and abuts against the second object.

17. The medical device of claim 15, further comprising a fastening device and a valve at the proximal end of the shaft, wherein the fastening device is configured to securely fasten one or more devices to the shaft and the valve is configured to:
   inhibit passage of fluid or gas through the lumen from the distal opening to the proximal opening of the shaft; and
   allow passage of the one or more devices through the lumen from the proximal opening to the distal opening of the shaft.

18. A medical device, comprising:
   a shaft having a proximal end, a distal end, and a lumen extending therebetween, wherein the proximal end of the shaft includes a lock assembly, the lock assembly including:
      a threaded portion disposed about an exterior surface of the shaft; and
      an anchor nut movably coupled to the threaded portion; and
   an ancillary device configured to receive the shaft, wherein the ancillary device is configured to at least partially be inserted into a body of a subject, wherein the anchor nut of the lock assembly is configured to abut a proximal end of the ancillary device to prevent distal axial movement of the shaft relative to the ancillary device.

19. The medical device of claim 18, further comprising a grasping tool fixed to and extending distally from the distal end of the shaft, wherein the grasping tool is configured to fix the distal end of the shaft relative to a target site, and wherein the grasping tool includes a clamp, and the medical device further comprises a handle at the proximal end of the shaft and configured to selectively actuate the grasping tool.

20. The medical device of claim 18, further comprising a fastening device and a valve at the proximal end of the shaft, wherein the fastening device is configured to securely fasten one or more devices to the shaft, and the valve is configured to:
   inhibit passage of fluid or gas proximally through the lumen; and
   allow passage of the one or more devices distally through the lumen.

* * * * *